United States Patent
Hudson, II et al.

(10) Patent No.: US 10,180,551 B2
(45) Date of Patent: Jan. 15, 2019

(54) OPTICAL FIBER CABLE BUNDLE

(75) Inventors: Harold Edward Hudson, II, Conover, NC (US); William Carl Hurley, Hickory, NC (US); Warren Welborn McAlpine, Hickory, NC (US); David Alan Seddon, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 1351 days.

(21) Appl. No.: 13/524,188

(22) Filed: Jun. 15, 2012

(65) Prior Publication Data

US 2012/0281955 A1 Nov. 8, 2012

Related U.S. Application Data

(63) Continuation of application No. PCT/US2012/036048, filed on May 2, 2012.

(60) Provisional application No. 61/481,925, filed on May 3, 2011.

(51) Int. Cl.
*G02F 1/295* (2006.01)
*G02B 6/44* (2006.01)

(52) U.S. Cl.
CPC .......... *G02B 6/44* (2013.01); *G02B 6/4413* (2013.01); *G02B 6/4432* (2013.01)

(58) Field of Classification Search
CPC ....... G02B 6/44; G02B 6/4413; G02B 6/4432
USPC .................. 385/102–106, 100–113
See application file for complete search history.

(56) References Cited

U.S. PATENT DOCUMENTS

| | | | | |
|---|---|---|---|---|
| 4,317,000 A | * | 2/1982 | Ferer | 174/70 R |
| 4,881,795 A | * | 11/1989 | Cooper | G02B 6/4415 |
| | | | | 385/104 |
| 6,011,887 A | * | 1/2000 | Kamei et al. | 385/103 |
| 6,048,648 A | | 4/2000 | Stokes et al. | 385/111 |
| 6,321,012 B1 | | 11/2001 | Shen | 385/106 |
| 6,377,736 B1 | | 4/2002 | Murphy | 385/100 |
| 6,591,045 B2 | | 7/2003 | Kawabata | 385/100 |
| 6,597,844 B1 | | 7/2003 | Witt et al. | 385/109 |
| 6,879,760 B2 | | 4/2005 | Griffioen et al. | 385/100 |
| 7,200,307 B2 | | 4/2007 | Bau' et al. | 385/111 |
| 7,221,831 B2 | | 5/2007 | Keller et al. | 385/102 |
| 7,382,955 B1 | | 6/2008 | Keller | |
| 8,565,565 B2 | * | 10/2013 | Barrett | G02B 6/4413 |
| | | | | 385/106 |

(Continued)

FOREIGN PATENT DOCUMENTS

| | | | | |
|---|---|---|---|---|
| EP | 983453 B1 | 11/2001 | | F16G 11/00 |
| EP | 1310814 A1 | 5/2003 | | G02B 6/44 |

(Continued)

OTHER PUBLICATIONS

Jakob Bohr, Kasper Olsen; "The ancient art of laying rope", Aug. 8, 2010, pp. 1-6.*

(Continued)

*Primary Examiner* — Thomas A Hollweg
*Assistant Examiner* — Guy Anderson
(74) *Attorney, Agent, or Firm* — Tamika A. Crawl-Bey

(57) ABSTRACT

Fiber optic bundles include helically stranded subunit cables. The assemblies have small cross sections and low bend radii while maintaining acceptable attenuation losses. Binders can be omitted to improve ease of processing and installation. Helically stranding of the subunit cables allows ease of access to the individual cables during installation.

4 Claims, 2 Drawing Sheets

(56) References Cited

U.S. PATENT DOCUMENTS

| | | | |
|---|---|---|---|
| 2001/0055452 A1 | 12/2001 | Kawabata | 385/100 |
| 2003/0012527 A1 | 1/2003 | Griffioen et al. | 385/100 |
| 2003/0123822 A1 | 7/2003 | Witt et al. | 385/109 |
| 2004/0071429 A1 | 4/2004 | Griffioen et al. | 385/136 |
| 2004/0156601 A1* | 8/2004 | Koyasu et al. | 385/100 |
| 2005/0173148 A1 | 8/2005 | Shuman et al. | 174/113 |
| 2005/0286843 A1* | 12/2005 | Dallas et al. | 385/109 |
| 2006/0147164 A1 | 7/2006 | Bau et al. | 385/111 |
| 2006/0153510 A1 | 7/2006 | Kim et al. | |
| 2006/0198585 A1 | 9/2006 | Keller et al. | 385/107 |
| 2006/0280413 A1 | 12/2006 | Paschal et al. | |
| 2008/0193091 A1 | 8/2008 | Herbst | |
| 2010/0067856 A1* | 3/2010 | Knoch | G02B 6/441 385/111 |
| 2011/0091171 A1 | 4/2011 | Tatat et al. | |
| 2011/0211793 A1 | 9/2011 | Barrett et al. | 385/104 |
| 2011/0280529 A1* | 11/2011 | Herbst | E21B 47/011 385/102 |

FOREIGN PATENT DOCUMENTS

| | | | |
|---|---|---|---|
| JP | 04194811 A | 7/1992 | |
| WO | WO98/53222 | 11/1998 | F16G 11/00 |
| WO | 2010/042816 A1 | 4/2010 | |
| WO | WO 2010042816 A1 * | 4/2010 | |

OTHER PUBLICATIONS

General Cable, SmartWrap™ Bundled Cable sheet, p. 165.

Fiber Optic Cables, Fundamentals Cable Design System Planning, 4$^{th}$ Edition, Jun. 8, 2001, pp. 124-125.

EP17186822.7 Search Report dated Nov. 30, 2017, European Patent Office.

International Search Report and Written Opinion PCT/US2012/036048 dated Aug. 17, 2012.

Patent Cooperation Treaty, International Search Report for PCT/US2012/36048, dated Aug. 17, 2012, 8 pages.

* cited by examiner

OPTICAL FIBER CABLE BUNDLE

PRIORITY APPLICATION

This application is a continuation of International Application No. PCT/US12/36048 filed May 2, 2012, which claims the benefit of priority to U.S. Provisional App. No. 61/481,925 filed May 3, 2011, the entire disclosure of both applications being incorporated herein by reference.

RELATED APPLICATIONS

This application is related to PCT/US2009/060163, filed Sep. 10, 2009, which claims priority to U.S. Provisional App. No. 61/104,142, filed Oct. 9, 2008, and 61/245,420, filed Sep. 24, 2009.

TECHNICAL FIELD

The present application relates generally optical fiber bundles having low bend radii and small cross-sectional areas.

BACKGROUND

Communications networks are used to transport a variety of signals such as voice, video, data and the like. As communications applications required greater bandwidth, communication networks switched to fiber optic cables since they are capable of transmitting an extremely large amount of bandwidth compared with copper conductors. Fiber optic cables are also much smaller and lighter compared with copper cables having the same bandwidth capacity. Conventional fiber optic cables, however, may be too large or rigid for some applications. For example, in a multiple dwelling unit (MDU) such as an apartment building, it is often necessary to run fiber optic cables through small spaces and around tight corners to provide access to individual dwelling units. Conventional fiber optic cables often are either too large in cross-section, too inflexible, or both, to be run to individual dwelling units.

Conventional MDU deployments also require pulling individual cables from the fiber distribution terminal (FDT) to each living unit. The technician typically unspools a cable down a hallway and then places them into a raceway molding. The raceway can become congested with cables, however, and the technician may be required to pull from 6-12 individual drop cables from the FDT to the living units. The time required to pull off of individual reels can also be disruptive to MDU tenants and add to labor costs of installation.

One proposed cable design is a jacketless cable designed for MDU with subunit cables SZ stranded together and held in place with polyester binders. The SZ stranded bundled solution offers a time savings advantage over deploying 6 and 12 loose single fiber cables. In some applications, however, binders in the design because they can be cumbersome to remove in the field and can get caught or frayed during installation. Additionally, if the binders are improperly applied with too high a tension, they may cause increased fiber attenuation as they tend to indent the cable subunits.

SUMMARY

According to one embodiment, a fiber optic bundle comprises an inner layer of at least one subunit fiber optic cable, and an outer layer of a plurality of subunit fiber optic cables helically stranded about the inner layer. Each subunit fiber optic cable comprises at least one optical fiber, a layer of loose tensile strength members surrounding the at least one optical fiber, and a polymeric subunit jacket surrounding the layer of loose tensile strength members.

According to one aspect, the bundle can be free of a glass-reinforced plastic (GRP) strength member so that the bundle can be routed through tight confines such as in an MDU. The outer layer of subunits can comprise the exterior perimeter of the bundle, with the bundle being free of external binders and a jacket, so that the individual bundles can be easily accessed during installation.

BRIEF DESCRIPTION OF THE DRAWINGS

The various features of the drawings are not necessarily drawn to scale.

DETAILED DESCRIPTION

Figure 1:
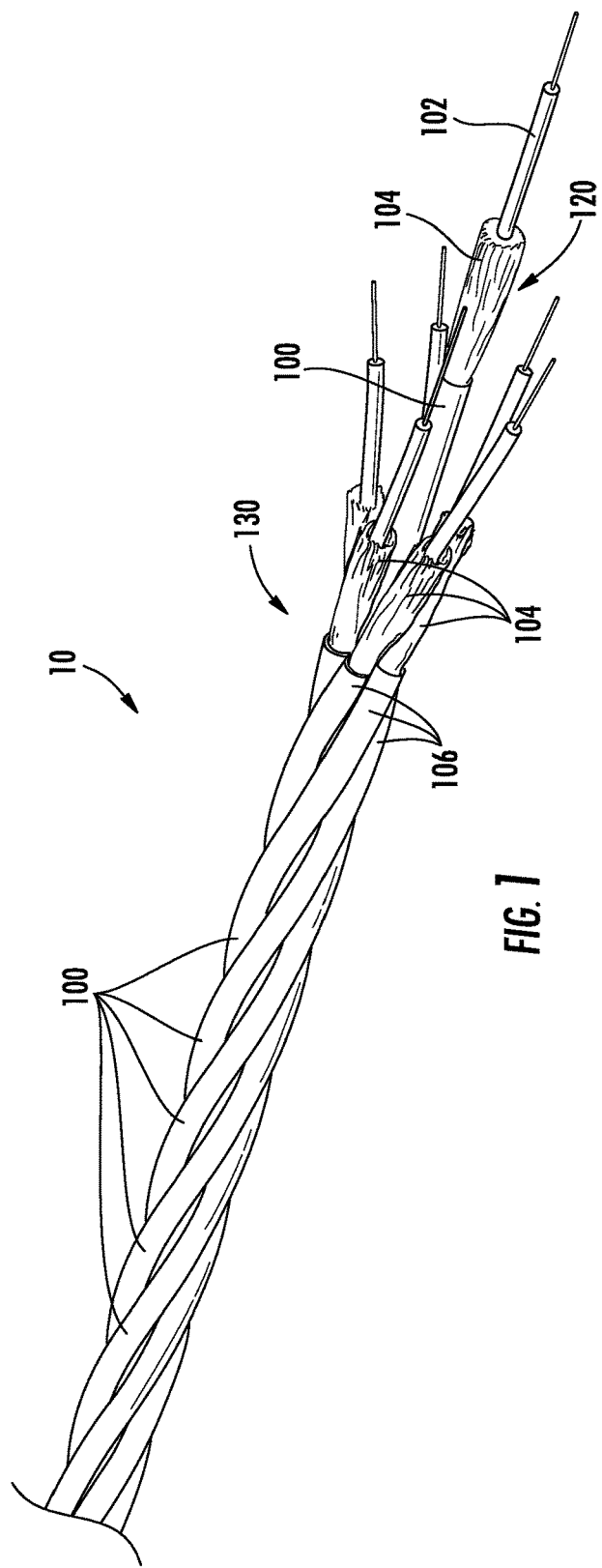
FIG. 1 is a perspective view of a portion of a fiber optic cable bundle according to a first embodiment of the invention.

Reference will now be made in detail to the present embodiments, examples of which are illustrated in the accompanying drawings. Whenever possible, the same reference numerals will be used throughout the drawings to refer to the same or like parts.

FIG. 1 is a perspective view of a portion of a fiber optic cable assembly 10, or fiber optic cable bundle 10 according to a first embodiment of the invention. The fiber optic cable bundle 10 comprises a unit of a plurality of bundled subunit fiber optic cables 100. The subunit cables 100 are not wrapped with binders to secure the subunit cables 100 in place. The bundle comprises an inner layer 120 of one or more subunit cables 100 and an outer layer 130 of a plurality of subunit cables 100. In the illustrated embodiment, the outer layer 130 includes five subunit cables surrounding a single subunit inner layer 120 in a "5-1" arrangement. The subunits 100 are helically stranded with high bundle integrity. The bundle is held together without binders by selecting proper helical lay-lengths and the dimensions of the units.

The individual subunits can correspond in structure and composition to the subunits described in PCT/US2009/060163, the entire contents of which are incorporated by reference. For example, each subunit fiber optic cable 100 can be a flame retardant single fiber cable. In the illustrated embodiment, the subunit fiber optic cable 100 includes a single buffered optical fiber 102 surrounded by a layer 104 of loose tensile strength members, and an outer polymer tubular subunit jacket or sheath 106 extruded over the layer 104 of strength members. According to the present embodiments, the layer 104 of loose tensile strength members adds sufficient tensile strength to the individual fiber optic subunits such that additional strength members are not required for the overall assembly 10. For example, assemblies as disclosed herein can be free of rigid strength members such as glass-reinforced plastic (GRP) rods, which add cost and increase the bend radii of cables. The buffer coating of the fiber may be formed of a polyvinyl chloride (PVC) material. Other suitable materials for the coating include polymeric materials such as ultraviolet light cured acrylate materials, polyethylene, PVDF, nylon or PVR. The outer subunit jacket

106 may be formed of PVC material, for example. Other suitable materials for the outer subunit jacket 106 include polymeric materials such as polyethylene, PVDF, or nylon. The layer 104 of tensile strength members can be aramid fiber yarns such as KEVLAR® available from E. I. du Pont de Nemours and Co., fiberglass, and aramid-reinforced plastics (ARP). The subunit jacket 106 and/or the buffer coating can include aluminum trihydrate, antimony trioxide, or other suitable additives to improve flame resistance.

The bundle 10 can be stranded into corresponding lay lengths based on bundle diameter so that the bundles maintain integrity while being bent, routed, and installed. The central subunit 100 is sized to accommodate the appropriate number of subunits 100 to be stranded. It may also be advantageous that all subunit cables 100 be sized the same to use the same connector parts. One method to accomplish this is to start with the desired subunit 100 size and overcoat to the correct sized central unit so that the finished bundle will maintain integrity. This can be accomplished by adding a slip layer between the up jacket so that the outer layer may be stripped away when attaching connectors. The subunit cables 100 can utilize bend insensitive fiber that may be bent to a 5 mm bend radius. It is desirable to the customers that the bundled subunits 100 be installable in the smallest molding commercially available. It is also desirable that the bundled cable 10 fit into the molding along with a connector sleeve assembly. The subunit cables 100 can be color coded for easy identification. The cable 10 may be sold in bulk to be installed with field installable connectors (not illustrated), or as cable assemblies with factory installed connectors (not illustrated).

Helical stranding is advantageous in that it facilitates mid-span access of the subunit cables 100, which is an important feature when the subunit cables 100 are to be deployed throughout structures such as multiple dwelling units. The adjoining inner and outer layers 120, 130 of subunit cables 100 can be stranded in separate passes on separate stranders, or on a common strander in a single pass. The subunit cables 100 of the inner layer 120 may be immediately adjacent and contacting those of the outer layer 130.

With no binders to maintain the bundle lay-length, technicians can avoid securing and cutting of the binders during installation. The absence of binders also avoids the problems of fraying or snagging of the binder material during installation, which could result in a damaged fiber bundle 10. The subunits 100 may be accessed by simply untwisting the lay length to select desired unit and once the desired subunit 100 is removed, the bundle 10 will resume lay. Helical stranding can equate to reductions in attenuation in the bundle 10, as well as substantially reducing processing time and complexity. The bundle is highly stable and the lay length of the individual subunits 100 is not adversely affected by factors such as loose binder tension or a malfunction of the machines applying binders, which renders processing more consistent and reduces reject rates.

As shown in FIG. 1, the six fiber design has five 1.65 mm outside diameter subunits 100 helically stranded around one 1.65 mm outside diameter central subunit 100. The subunit lay length is approximately 50 mm, in the range of 40-60 mm, and the bundle diameter is approximately 4.8 mm, in the range of 4.6-5.2 mm. Average bundle diameter can be approximated by circumscribing the bundle with a circle at multiple cross-sections of the bundle. If stranding six subunits 100 together, it would be necessary to use a central element to ensure a round, tightly packed layer, however, if one of the elements is placed in the center and the lay length is shortened, then the same tight packing can be achieved in addition to gaining a high level of flexibility afforded by the short lay length. Having too short a lay length, however, can have a detrimental effect on fiber reliability, macro bend induced attenuation or both, depending on the fiber type in the cable. The subunit in the outer layer 130 can be of the same outside diameter, generally in the range of 1.6-1.7 mm.

Figure 2:
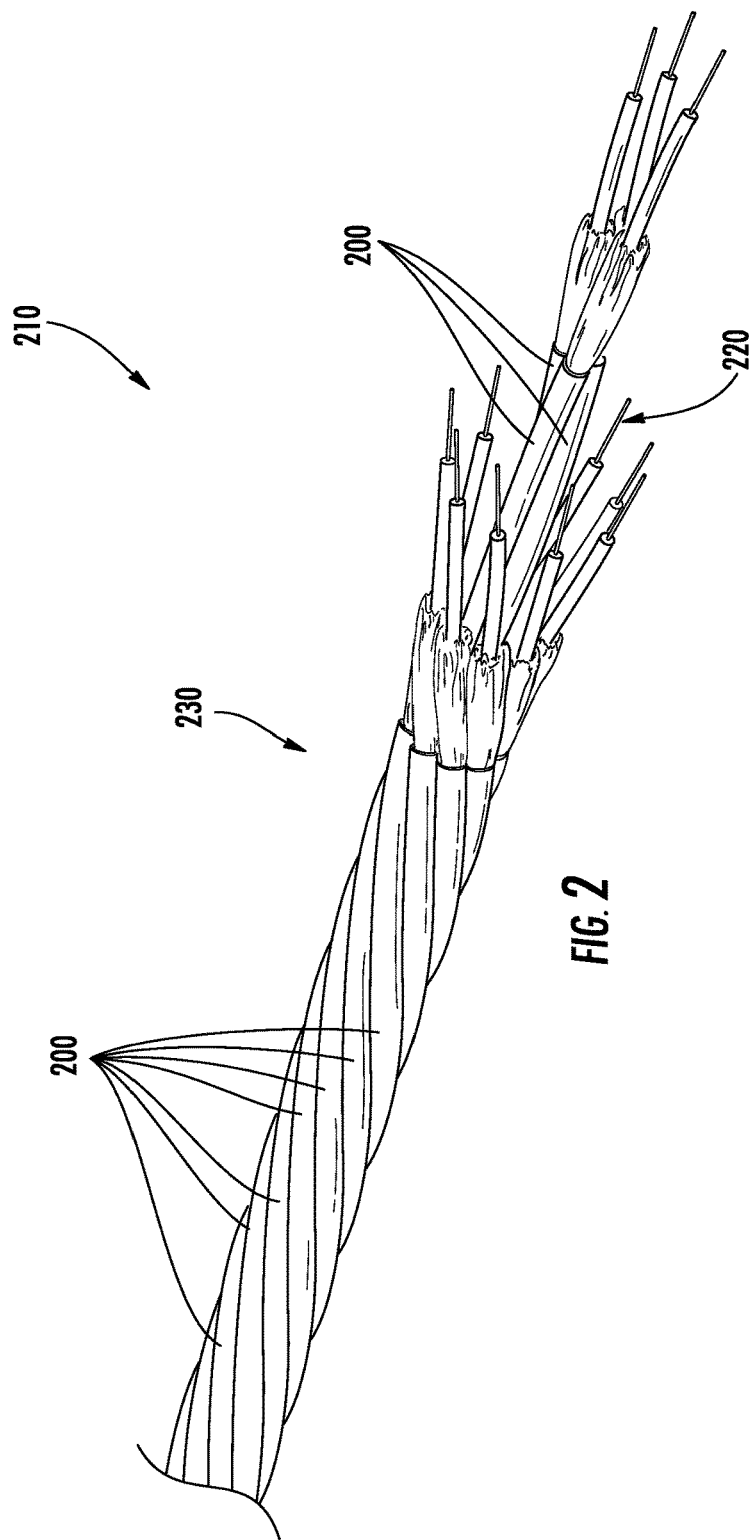
FIG. 2 is a perspective view of a portion of a fiber optic cable bundle according to a second embodiment of the invention.

FIG. 2 is a perspective view of a portion of a fiber optic cable assembly 210, or fiber optic cable bundle 210 according to a second embodiment of the invention. The fiber optic cable bundle 210 comprises a unit of twelve helically stranded bundled subunit fiber optic cables 200. The subunit cables 200 are not wrapped with binders to secure the subunit cables 200 in place. The bundle comprises an inner layer 220 of a plurality of subunit cables 200 and an outer layer 230 of a plurality of subunit cables 200. In the illustrated embodiment, the outer layer 230 includes nine subunit cables surrounding a three subunit inner layer 220 in a "9-3" arrangement. The subunits 200 are helically stranded with high bundle integrity. The individual subunits can correspond in structure and composition to the subunits described in PCT/US2009/060163, and to the subunits 100 discussed above. The assembly 210 is held together without binders by selecting proper helical lay-lengths and the dimensions of the units.

The bundle 210 can be stranded into corresponding lay lengths based on bundle diameter so that the bundles maintain integrity while being bent, routed, and installed. The subunits 200 in the inner layer 220 may be sized to accommodate the appropriate number of subunits 200 to be stranded. It may also be advantageous that all subunit cables 200 be sized the same to use the same connector parts. The subunit cables 200 can utilize bend insensitive fiber. The adjoining inner and outer layers 220, 230 of subunit cables 200 can be helically stranded in separate passes on separate stranders, or on a common strander in a single pass. The subunit cables 200 of the inner layer 220 may be immediately adjacent and contacting those of the outer layer 230.

As shown in FIG. 2, the twelve fiber design has nine 1.65 mm outside diameter subunits 200 helically stranded around three 1.65 mm outside diameter central subunits 200. The subunit lay length is approximately 70 mm, in the range of 60-80 mm, or in another embodiment in the range of 65-75 mm, and the average bundle diameter is approximately 6.4 mm, in the range of 6.2-6.6 mm.

An eight fiber design has seven 1.65 mm outside diameter subunits 200 helically stranded around one 2.00 mm outside diameter central subunit 200. The subunit lay length is approximately 60 mm, in the range of 50-70 mm, and the bundle diameter is approximately 5.2 mm. In this case the bundles size is kept to a minimum by using an oversized central element to strand the other seven subunits around. This again allows for a high degree of flexibility and the production of a round closely packed structure. An alternative eight fiber design has eight 1.65 mm outside diameter optically conductive subunits 200 helically stranded around one 2.9 mm outside diameter central subunit. In this embodiment, the central subunit can be without an optically conductive fiber, and can include a mechanical fiber, such as an aramid. The subunit lay length is approximately 60 mm, in the range of 50-70 mm, and the bundle diameter is approximately 6.10 mm. In this case the bundles size is kept to a minimum by using an oversized central element to strand the eight subunits around. This again allows for a high degree of flexibility and the production of a round closely packed structure. Both eight fiber configurations use a larger subunit as the central member which may not be desirable by some installers. Therefore, up jacketing over a 1.65 mm subunit cable to the desired size would allow the installer to peel away the up jacket and allow only one connector crimp band size to be used for all the subunits in the bundle.

In the present embodiments, the lay length is chosen such that the unit is able to hold itself together while being handled and installed. If the lay length is too long, the layer or layers open up and the cable loses its integrity. The elimination of binder yarns is enabled by the non-standard use of oversize central elements or reducing the number of elements in the layer than is normally the case for such stranded constructions. Additionally, the coupling provided by installation from a small diameter reel such as the Corning "Reel in a Box" solution confines the twist and insure bundle stability.

In the subunits in this specification, low smoke zero halogen materials may be used as a tight buffer material and as a subunit jacket material. A plenum rated PVC may be used as the tight buffer and the jacket material. Additional material variations could include: polyesters, nylons, or TPE's depending on the end application. The subunit outside diameter could be sizes other than 1.65 mm. For example, a 500 micron tight buffered fiber can be used for smaller diameter cables. The bundled sub-unit configuration could be other than that which is listed above. For example, fifteen sub-units could be contra-helically stranded around nine inner sub-units for higher fiber count bundles. The sub-units could be water-blocked for outdoor applications. The bundled assembly may use single fiber connectors or multiple fiber connectors such as the Corning "MTP" connector.

The optical fibers used in the subunit fiber optic cables 100 may be bend-insensitive optical fibers. Examples of bend-insensitive optical fibers include the ClearCurve™ brand of optical fibers available from Corning Incorporated. Such fibers may have bend radii as low as 5 mm with low attenuation.

The fiber optic cable bundles can be adapted for indoor use, for example, such that an outside cable sheath for the fiber optic cable bundle is unnecessary. The absence of an outer jacket, as well as omitting a central strength member, in part provides the fiber optic cable bundles with its relatively low bend diameter. By contrast, in conventional cables, maximum allowable strains on the outer surface of the cable jacket limit the cable bending radius to at least about 5 to 10 times the outer cable diameter. Each subunit cable may be provided with a flexible strength component, so that the fiber optic cable bundle has sufficient tensile strength while remaining flexible.

According to the above-described embodiments, the low bend diameter and small cross-sectional area in part allow the fiber optic cable bundles to be bent around corners and otherwise introduced into tight spaces or through apertures, while maintaining acceptable attenuation loss performance. The fiber optic cable bundle is therefore particularly suited for providing fiber optic service indoors to structures such as multiple dwelling units (MDU). In one method of installation, a fiber optic cable bundle could be placed in a corner molding raceway and single fiber subunit cables can be dropped at each apartment of a MDU. While the subunit cables can be stranded in various ways, helically stranding provides ease of access at midspan locations of the assembly.

According to one aspect of the present invention, the subunit cables of the fiber optic assemblies can be colored according to industry standard code. The fiber optic assemblies could be placed in a corner molding raceway and single fiber subunit cables can be dropped at each apartment of a MDU. Each individual cable can also have a unique print identifier to facilitate connection to the correct FDT port. For example, at a first living unit of an MDU, the technician can access a subunit cable with "CONN 1" printed thereon. The second living unit can receive the white subunit cable with "CONN 2" printed thereon, and so on through the sixth subunit labeled "CONN 6." The direction of the print can be used to facilitate error-free installation, and can be arranged to as to always point away from (or toward) the FDT. This enables the technician to cut the subunit cable and reliably drop to the proper location. This is an important feature because the technician must typically cut the subunit cable at a point at least six feet past the point where the terminated drop is to be placed. Helically stranding provides ease of access to subunit cables at midspan locations of the fiber optic assemblies. Dual six fiber color coding (e.g. blue through white and black through aqua) can be used in twelve-fiber embodiments to provide two paths exiting the connection closet in MDUs. The lower color fibers (e.g. blue through white), for example, can be routed to lower numbered apartments in one direction and higher color fibers (e.g. black through aqua) can be routed in the opposite direction. Splitting groups of six fibers in this manner reduces the amount of cable needed per floor.

According to the above-described embodiments, the low bend diameter and small cross-sectional area in part allow the fiber optic assemblies to be bent around corners and otherwise introduced into tight spaces or through apertures, while maintaining acceptable attenuation loss performance. The fiber optic assemblies are therefore particularly suited for providing fiber optic service indoors to structures such as multiple dwelling units (MDU).

The illustrated embodiments show fiber optic cable assemblies having a plurality of single fiber subunit cables. Subunit fiber optic cables having more than one optical fiber, such as two, three or more optical fibers, may also be used in fiber optic cable assembly embodiments constructed according to the principles of the present invention. Further, varying numbers of subunit cables, such as eight, twenty-four, etc., can be arranged into a fiber optic cable assembly according to the present invention.

The Fourth Edition of Fiber Optic Cables, Fundamentals of Cable Design System Planning, dated Jun. 8, 2001 states on page 125: "In helical stranding the stranding elements are stranded in one direction with a constant angle to the longitudinal axis of the cable. In reverse lay (SZ) stranding the direction of stranding reverses after a predetermined number of revolutions, so that the stranding elements first describe an S along the cable axis and then, after reversing, a Z. At the reversal point they lie parallel to the axis of the cable" (emphasis in the original). This definition corresponds to the present use of helical stranding as shown in the FIGS. and contrasted with SZ stranding discussed in the last paragraph of the Background.

Many modifications and other embodiments within the scope of the claims will be apparent to those skilled in the art. For instance, the concepts of the present invention can be used with any suitable fiber optic cable design and/or method of manufacture.

What is claimed is:

1. A fiber optic cable bundle, comprising:
an inner layer of at least one subunit fiber optic cable; and
an outer layer of a plurality of subunit fiber optic cables helically stranded about the inner layer, wherein the inner layer comprises a single subunit and the outer layer comprises five subunits, wherein the outer layer of subunits comprises the exterior perimeter of the bundle and the bundle is free of external binders and a jacket, wherein a helical lay length of the outer layer is between 40-60 mm, and wherein each subunit fiber optic cable comprises:
- at least one optical fiber;
- a layer of loose tensile strength members surrounding the at least one optical fiber; and
- a polymeric subunit jacket surrounding the layer of loose tensile strength members; and wherein the bundle is free of a glass-reinforced plastic (GRP) strength member.

2. The fiber optic cable bundle of claim 1, wherein a helical lay length of the outer layer is between 45-55 mm.

3. A fiber optic cable bundle, comprising:
an inner layer of at least one subunit fiber optic cable; and
an outer layer of a plurality of subunit fiber optic cables helically stranded about the inner layer, wherein each subunit fiber optic cable comprises:
- at least one optical fiber;
- a layer of loose tensile strength members surrounding the at least one optical fiber; and
- a polymeric subunit jacket surrounding the layer of loose tensile strength members;

wherein a helical lay length of the outer layer is between 50-70 mm, wherein the subunits of the inner and outer layers are helically stranded with high bundle integrity, and wherein the bundle is held together without binders, at least in part, by selecting a proper helical lay-lengths.

4. A fiber optic cable bundle, comprising:
an inner layer of at least one subunit fiber optic cable; and
an outer layer of a plurality of subunit fiber optic cables helically stranded about the inner layer, the inner layer comprises one central subunit and the outer layer comprises eight subunits, the subunit in the inner layer having an outside diameter that is greater than an outside diameter of the eight subunits in the outer layer, and wherein each subunit fiber optic cable comprises:
- at least one optical fiber;
- a layer of loose tensile strength members surrounding the at least one optical fiber; and
- a polymeric subunit jacket surrounding the layer of loose tensile strength members;

wherein a helical lay length of the outer layer is between 50-70 mm and a diameter of the subunit in the inner layer is in the range of 2.8-3.0 mm;
wherein a diameter of the subunits in the outer layer is in the range of 1.6-1.7 mm;
wherein the tensile strength members comprise aramid yarn;
wherein the bundle is free of a glass-reinforced plastic (GRP) strength member; and
wherein the outer layer of subunits comprises the exterior perimeter of the bundle and the bundle is free of external binders and a jacket.

* * * * *